United States Patent
Powell, Jr.

(10) Patent No.: US 10,287,202 B2
(45) Date of Patent: May 14, 2019

(54) NOZZLED CONFINED CONTAINER FOR TREATING SLUDGE

(71) Applicant: John E. Powell, Jr., Kenedy, TX (US)

(72) Inventor: John E. Powell, Jr., Kenedy, TX (US)

( * ) Notice: Subject to any disclaimer, the term of this patent is extended or adjusted under 35 U.S.C. 154(b) by 225 days.

(21) Appl. No.: 15/145,736

(22) Filed: May 3, 2016

(65) Prior Publication Data

US 2016/0244350 A1    Aug. 25, 2016

Related U.S. Application Data

(63) Continuation-in-part of application No. 13/961,632, filed on Aug. 7, 2013, now abandoned.

(Continued)

(51) Int. Cl.
*B01F 5/02* (2006.01)
*B01J 4/00* (2006.01)
(Continued)

(52) U.S. Cl.
CPC ............... *C02F 11/00* (2013.01); *B01F 5/02* (2013.01); *B01F 5/0218* (2013.01); *B01F 5/0231* (2013.01); *B01J 4/002* (2013.01); *B01J 2204/002* (2013.01); *C02F 11/14* (2013.01); *C02F 11/18* (2013.01); *C02F 2201/002* (2013.01); *C02F 2203/006* (2013.01); *C02F 2301/02* (2013.01); *C02F 2301/024* (2013.01); *C02F 2303/08* (2013.01); *C02F 2303/20* (2013.01); *C02F 2303/22* (2013.01); *C02F 2303/26* (2013.01); *C02F 2307/08* (2013.01)

(58) Field of Classification Search
CPC ............... C02F 11/00; C02F 2201/002; C02F 2203/006; C02F 2307/08; C02F 2303/08; C02F 2303/20; C02F 2303/22; C02F 2301/02; C02F 1/66; C02F 1/686; C02F 1/76; C02F 101/101; C02F 2103/18; C02F 2209/02; C02F 2209/40; C02F 2103/06; C02F 2103/365; C02F 11/14; C02F 11/18; C02F 2301/024; C02F 2303/26; B01J 4/002; B01J 2204/002; B01D 17/00; B01D 17/0208; B01D 17/042; B01D 17/041; B01D 17/047; B01D 17/0214; B01D 21/009; B01D 21/01; B01D 21/245; B01D 21/2416; B01D 21/0018; B01D 21/0087; B01D 21/2488; B01D 21/2405; B08B 9/0933; B01F 5/02; B01F 5/025; B01F 5/218; B01F 5/0218; B01F 5/0231
See application file for complete search history.

(56) References Cited

U.S. PATENT DOCUMENTS 5,575,705 A * 11/1996 Yam .................. B08B 3/06
134/7

* cited by examiner

*Primary Examiner* — Katherine Zalasky
*Assistant Examiner* — Benjamin L Lebron
(74) *Attorney, Agent, or Firm* — Mark A. Oathout; Oathout Law Firm

(57) ABSTRACT

The disclosure relates to an apparatus, system, and methodology for treating nested waste matter, including a delivery system for delivering a volume of untreated material; a confined container having an inlet connected to the delivery system; an energy impingement device introduced transversely into said confined container, where the energy impingement device is configured to deliver a volume of injected fluid and further configured to treat the volume of untreated material in said confined container and wherein the confined container has an outlet for exiting a volume of treated material.

2 Claims, 2 Drawing Sheets

Related U.S. Application Data

(60) Provisional application No. 61/680,531, filed on Aug. 7, 2012.

(51) Int. Cl.
*C02F 11/00* (2006.01)
*C02F 11/14* (2006.01)
*C02F 11/18* (2006.01)

NOZZLED CONFINED CONTAINER FOR TREATING SLUDGE

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Sludge forms when naturally occurring solids as well as rust and scale from piping and tank walls, and higher molecular weight hydrocarbons separate from lighter hydrocarbons and sink to bottoms. This matter, referred to as sludge, over time forms on the bottom on storage vessels. Operators must deal with this sludge problem as it hampers normal procedures and increases handling and treatment costs.

BRIEF SUMMARY OF THE EMBODIMENT(S)

An apparatus, system, and methodology for treating nested waste matter, including a delivery system for delivering a volume of untreated material; a confined container having an inlet connected to the delivery system; an energy impingement device introduced transversely into said confined container, where the energy impingement device is configured to deliver a volume of injected fluid and further configured to treat the volume of untreated material in said confined container and wherein the confined container has an outlet for exiting a volume of treated material.

As used herein, the term "transversely" shall refer to any angle not parallel to the direction of flow of untreated material at the inlet to the confined container or angle as shown in the figures.

BRIEF DESCRIPTION OF THE SEVERAL VIEWS OF THE DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF THE EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
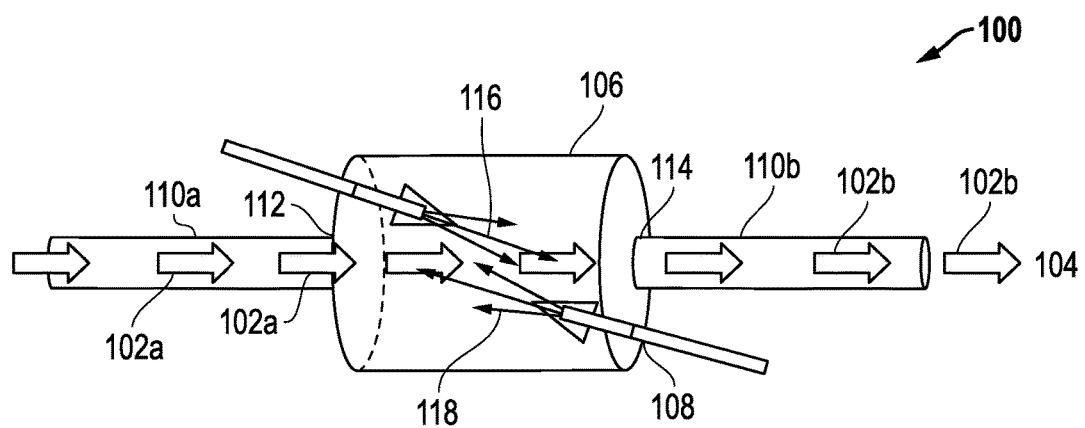
FIG. 1 depicts a schematic diagram of a portion of a process system having a confined container for effecting one or more process materials.

FIG. 1 depicts a portion of a process system 100 for delivering materials 102 to a location 104. The process system 100 may have a confined container 106 for effecting and/or treating the materials 102 flowing through the process system 100 changed to the further benefit of the operator's desire. The process system 100 may be any suitable process system for delivering materials including, but not limited to, a storage tank, a coker unit, a coal plant, any vessel in which nested waste matter has formed, and the like. The confined container 106 may have one or more energy impingement devices 108 configured to treat the materials in the confined container 106 as will be discussed in more detail below.

The process system 100 may have any suitable delivery system for delivering the material 102 into and/or out of the confined container 106. As shown, a pipe 110a and 110b is coupled to an inlet 112 and an outlet 114 of the confined container 106. The pipe 110a may deliver untreated materials 102a into the confined container 106. The pipe 110b may deliver the treated materials 102b from the confined container 106 to the location 104. Although the delivery system 110a, 110b is shown as pipe 110, it may be any suitable delivery system including, but not limited to any pipe combination, any vessel combination, a hopper, piping, a conveyor, flex hose, tubing, lance, any combination thereof, and the like, and preferably used inside the confined container 106 for processing.

The confined container 106 is configured to treat, or effect, the material 102 flowing through the process system 100. The confined container 106 may treat, or effect, the material 102 by any suitable method including, but not limited to, heat, impingement, agitation, chemical reactions, dilution factors, fluid impingement, thermal energy, mixing, organic digestion, propulsion, any combination thereof and the like. Once the materials are treated in the confined container 106, the material 102 has been changed and/or altered for treatment, processing and/or handling. The confined container 106 as shown is a cylindrical container, although it may be any suitable container including but not limited to a spherical container, a rectangular container, a ship-vessel shaped container, a dome container, an underground cavity shaped container, an ovular container, pipe container, hopper, flex hose, tubing, or any vessel combination or containment and the like. The material 102 in the confined container 106 may be vigorously treated, or mixed. This vigorous treatment may be enhanced by any suitable chemicals, bio-chemicals, biological additives, or enhancement products which may include microorganisms, additives, food, and the like in order to enhance the treatment process.

The one or more impingement devices 108 may be any suitable device for introducing the treatment into and/or out of the confined container 106. As shown in FIG. 1, the impingement devices 108 are nozzles for injecting fluids or delivering energy into the confined container. The injected fluids 116 may be any suitable fluids including, but not limited to, water, steam, air, gas, additives, chemicals, heated gases, superheated steam, microorganism carrying mixtures, dispersants any combination thereof, and the like. The injected fluids 116 may be entrained with solid matter 118 (such as beads, Nano-scale beads, or small engineered pierce-shaped and weighted solids, sands and the like which may be added or may derive from nested sands in the waste material being treated) for in one exemplary embodiment creating a "shotgun effect" when the entrained fluid is injected with free movement of individual particles of the solid matter 118 into the confined container 106 and into the material to be treated. When delivering energy to the process system 100, the energy may include, but is not limited to: chemical, biological, thermal (e.g. hot or cold), electrical, vibration, in any combination best known to one of ordinary skill in the art. Although the impingement devices 108 are shown as nozzles, it should be appreciated that they may be any suitable devices including, but not limited to, orifices, apertures, lanced nozzles, pipes or pipe combinations, hopper, flex hoses, tubing, or any combination thereof and the like The treated material 102b exiting via the pipe 110b is affected by one or any combination of factors including, but not limited to, heat, impingement, chemical, dilution agitation and/or propulsion factors. Accordingly, the treated material 102b exists in an altered state (as compared to its condition upon entry as untreated material 102a) and may next be further treated, processed or handled by other means, additional in-line process systems 100 and/or process systems 100 in parallel. In one example, the treated material 102b may next be introduced into another identical process system 100. In another example, the treated material 102b may next be introduced into a commercially available centrifuge. In a third example, the treated material 102b may next be introduced into another identical process system 100 to be followed in line by a commercially available centrifuge. These three examples are not intended to be limiting of the options that are available.

Figure 2:
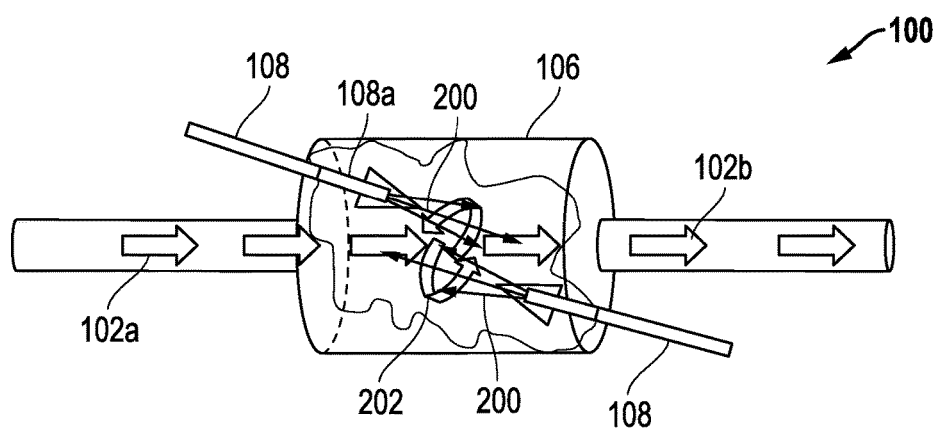
FIG. 2 depicts a schematic view of the portion of the process system of FIG. 1.

FIG. 2 depicts the process system 100 of FIG. 1 enhanced and configured to inject high pressure fluid, mixtures or water 200 into the confined container 106 via the impingement devices 108. Enhancing the treatment process system 100 may also include introducing mechanical energy, chemical, and/or thermal changes to the confined container 106. The high pressure fluid 200 may be heated in order to treat the material 102 flowing through the confined container 106. In an embodiment, the impingement devices 108 may comprise a nozzle creating a turbo nozzle effect configured to swirl and mix the materials 102 as shown by one or more volumes or streams (represented by flow lines) 202 within the confined container 106. Although the impingement devices 108 are shown as nozzles, it should be appreciated that they may be any suitable devices including, but not limited to hydro blasting nozzles, shearing tools, mixing devices, any combination thereof and the like. The swirling may cause heavier materials to disperse from the main flow of the materials 102 thereby purifying the materials. The nozzles 108 may be indexed to alternate or coordinate by time and/or three dimensional positioning to create eddies or counter-flow volumes or streams (represented by flow lines) 202. The nozzles may be mounted allowing three dimensional rotation, thrusting and/or withdrawal of the nozzle lances 108a for further effect. The confined container 106 may act as a centrifuge to disperse and/or separate the materials flowing through the process system 100

Figure 3:
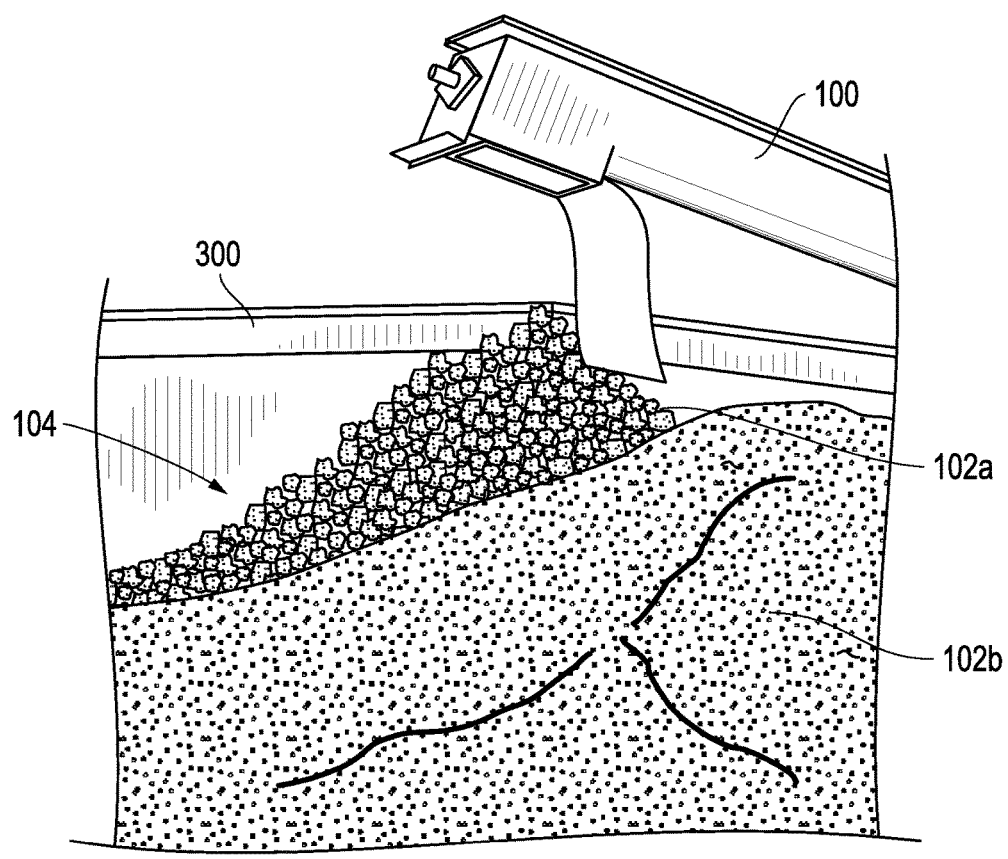
FIG. 3 depicts a view of an end product produced by the process system of FIGS. 1 and 2 side-by-side with an end product resulting from the prior art technology.

FIG. 3 depicts the location 104 that the materials are finally sent to in an embodiment. In this embodiment, the location is an atmospheric storage container 300. It should be appreciated that the location 104 may be any suitable location including, but not limited to, a storage tank, a pit, another process system and the like. As shown, a portion of the material in the location 104 is the treated material 102b and a portion is untreated material 102a. As shown, the untreated material (or material treated through a centrifuge only) 102a is denser and contains more impurities. The treated material 102b is finer and has fewer impurities. By way of example only, the untreated material 102a may have 14% oil, 22% water and 64% solids, and the treated material may comparatively have 2% oil, 4% water, and 94% solids. The ranges of solids versus oil and water may vary depending on the desired results and process used. Therefore, the confined container 106 may purify the materials 102 flowing through the process system 100 prior to reaching the location 104.

In one working embodiment referring to FIGS. 1-2, the confined container 106 has a diameter of about from two to three feet in diameter with the nozzles 108a of the two impingement devices 108 spaced or juxtaposed (in relation to each other) about three inches apart for continuous flow, single pass of the volume of untreated material 102a entering on the left and a volume of treated material 102b exiting on the right. The volume of injected fluid is injected via the two impingement devices 108. Flow at the entrance 112 and/or exit 114 may be constricted or closed off for any amount of time as desired by any know means such as a valve. The two opposing and juxtapositioned impingement devices 108 introduced at oblique angles (to the direction of flow vector at the inlet 112 and outlet 114) create a "shear wall" that all pumped fluids must pass through creating impingement factors the create shear, impinging and confining within a confined space (both within the container 106 and within the shear wall defined by between the two opposing and juxtapositioned impingement devices 108 achieving a result that is unattainable in any other way. The rods of the impingement devices 108 are equipped with internal high pressure threaded pipe that can be changed to adjust the shear wall depth within the confined container 106. This blast interface at such a shear wall creates the highest impingement factors known in the industry creating hydrocarbon recovery from impregnated sludge solids by passing through such a shot gun effect interphase. This is a single pass continuous flow system that produces up to 99.9% Hydrocarbon recovery from the raw sludge that enters The term/phrase "shotgun effect" refers to the short range blast with significant force with free movement that is created when exiting the blast nozzles 108a. The "shotgun effect" lines of force are shown in FIGS. 1 & 2 leaving the impingement devices 108 nozzles 108a as arrow vectors colliding into each other creating the shot gun blast effect that the raw sludge 102a must pass 100 percent through that creates the unprecedented 99.9% hydrocarbon recovery results. FIG. 3 shows a side by side view of what a cleaner solid looks like where hydrocarbons are recovered in a greater percentage. This economic method of recovery puts waste oil back into the market for use.

In another exemplary embodiment referring again to FIGS. 1-2, sludge is not treated, yet using the same exact method to make ice create (the only difference is the ingredients. Any starter ice cream formulation or composition of matter may enter as the volume of untreated material 102a. Air and nitrogen may be injected as the volume of injected fluid through the juxtapositioned and opposing impingement devices/blast nozzles 108 for mixing of the ice cream (as opposed to, e.g., hot fresh water injected for sludge. Cold or reduction of temperature may be introduced as known (e.g. via the volume of untreated material 102a, the volume of injected fluid, and/or the surrounding the confined container 106). Passing the ice cream mixture through the confined container 106 for mixing results in a frozen ice cream product.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method for treating a sludge, comprising the steps of:
delivering a volume of untreated material;
confining the untreated material in a confined container, said confined container having an inlet defining a first position connected to the delivery system, and wherein the inlet defines an inlet flow vector of the volume of untreated material into said confined container, and wherein said confined container has an outlet defining a second position for exiting a volume of treated material and defining an outlet flow vector, wherein the outlet is located opposite the inlet in said confined container;
indexing transversely and obliquely two opposing and spaced apart energy impingement devices to the inlet flow vector of the volume of untreated material into said confined container;
delivering a volume of injected fluid through the two energy impingement devices into said confined container for creating counter-flow to the inlet flow vector of the volume of untreated material, for impinging and shearing the flow transitioning from the first position as the volume of untreated material in said confined container to the second position as the volume of treated material, and for shot gun effecting the volume of untreated material through a shear wall in a continuous single confined pass to the outlet flow vector; and
exiting a volume of treated material from the container; wherein the confined container has a diameter of less than or equal to about three feet; wherein the two energy impingement devices have nozzles at the opposing ends; and wherein said step of indexing transversely and obliquely the two opposing and spaced apart energy impingement devices includes spacing apart the nozzles by about three inches for impinging, shearing and enhancing the continuous flow, single confined pass of the volume of untreated material.

2. The method according to claim 1, wherein said step of delivering the volume of injected fluid through the two energy impingement devices further comprises entraining the volume of injected fluid with a solid matter for further shot gun effecting the volume of untreated material.

* * * * *